United States Patent
Storm

(10) Patent No.: US 6,712,332 B1
(45) Date of Patent: Mar. 30, 2004

(54) SOLENOID VALVE

(75) Inventor: Uwe Storm, Bedburg-Hau (DE)

(73) Assignee: Uni-Gërate E. Mangelmann Elektrotechnische Fabrik GmbH (DE)

( * ) Notice: Subject to any disclaimer, the term of this patent is extended or adjusted under 35 U.S.C. 154(b) by 0 days.

(21) Appl. No.: 10/110,158
(22) PCT Filed: Sep. 26, 2000
(86) PCT No.: PCT/DE00/03336
§ 371 (c)(1), (2), (4) Date: Apr. 5, 2002
(87) PCT Pub. No.: WO01/25659
PCT Pub. Date: Apr. 12, 2001

(30) Foreign Application Priority Data

Oct. 6, 1999 (DE) .......................... 199 47 958

(51) Int. Cl.$^7$ .............................. F16K 31/06
(52) U.S. Cl. .............................. 251/129.04; 257/129.09
(58) Field of Search ....................... 257/129.01, 129.04, 257/129.09, 129.1, 129.15; 361/152, 154, 155, 156

(56) References Cited

U.S. PATENT DOCUMENTS 3,415,487 A 12/1968 Robarge
4,065,096 A * 12/1977 Frantz et al. ............. 251/129.1
4,679,766 A 7/1987 Cuming
4,925,156 A 5/1990 Stoll et al.
5,363,270 A * 11/1994 Wahba ........................ 361/155
6,120,005 A * 9/2000 Wright .................. 251/129.09

FOREIGN PATENT DOCUMENTS

| DE | 3824545 | 1/1990 |
| DE | 4307878 | 9/1994 |
| DE | 19753369 | 6/1999 |
| GB | 1315493 | 5/1973 |

* cited by examiner

Primary Examiner—John Bastianelli
(74) Attorney, Agent, or Firm—R W Becker & Associates; R W Becker

(57) ABSTRACT

A solenoid valve having a valve disc on a movable armature that is subjected to a restoring spring and a magnet coil. The magnet coil has a pick-up winding with a high-electrical capacity for opening and closing the valve and a holding winding whose capacity is such that it can hold the valve disc in the position in which it is lifted off of the valve seat when the valve is opened or on the valve seat when the valve is closed. A capacitor can be charged with a system voltage that is applied and can be momentarily connected to the pick-up winding in order to open or close the magnetic valve is also provided.

2 Claims, 3 Drawing Sheets

SOLENOID VALVE

BACKGROUND OF THE INVENTION

The invention relates to a magnetic or solenoid valve, on the movable armature of which is attached the valve disk that is acted upon by a restoring spring, and the magnet coil of which has a pickup winding with a high electrical capacity for opening or closing the valve, and a holding winding, the capacity of which is designed to hold the valve disk in a position where it is raised from the valve seat when the valve is open, and hold the valve disk in a position where it rests against the valve seat when the valve is closed.

The magnet coil in such solenoid valves encompasses a pickup winding and a holding winding with center tap. The pickup winding must be designed with high electrical capacity in order to actuate the magnet armature and thus the valve disc with substantial force in the opening and closing direction of the valve to open and close the solenoid valve. Once the valve has been opened or closed, there is a switch to holding capacity, which is sufficient to hold the valve disc in the open or closed position. DE 43 07 878 A1, which concerns such a solenoid valve, reports that it is known from DE 38 24 545 A1 in a contactless switching arrangement to insert in the feed line to the coil a parallel switch from a capacitor and a resistor, whereby when turned on, that is, for the pickup phase, there is a brief, distinct increase in the starting current corresponding to the capacitor capacity.

The object of the invention is to provide a solenoid valve in which the electrical control power can be reduced using simple means, especially when opening and closing the solenoid valve.

SUMMARY OF THE INVENTION

The solenoid valve of the present invention is characterized primarily in that the magnet coil comprises a pickup winding and a holding winding with a center tack, in that for opening and closing a capacitor is respectively connectable to a line branch leading to the pickup winding and to a branch leading to the center tap, and in that a DC/DC converter is disposed upstream of the capacitor such that the capacitor can be switched between a state where it is connected to the converter and a state where it is connected to the pickup winding. These features serve to realize this object. Thus it is possible to assure reliable opening and closing of the solenoid valve using simple circuit engineering means in that the pickup current or pickup capacity is taken from the capacitor, depending on the mechanical design of the solenoid valve either during opening of the valve or closing thereof, while subsequently only a small holding current must be taken from the connected consumer power supply. For the period in which the capacitor is charging a small charging current is also required that is not needed once the capacitor has been charged.

Pursuant to a preferred embodiment of the invention, a timer is provided for switching from pickup current operation to holding current operation, wherein the pickup winding and the holding winding are in series and the enter tap line branch is interrupted.

BRIEF DESCRIPTION OF THE DRAWINGS

Exemplary embodiments of the inventive solenoid valve are explained in greater detail in the following using the attached drawings. The drawings illustrate.

DESCRIPTION OF PREFERRED EMBODIMENTS

Figure 1:
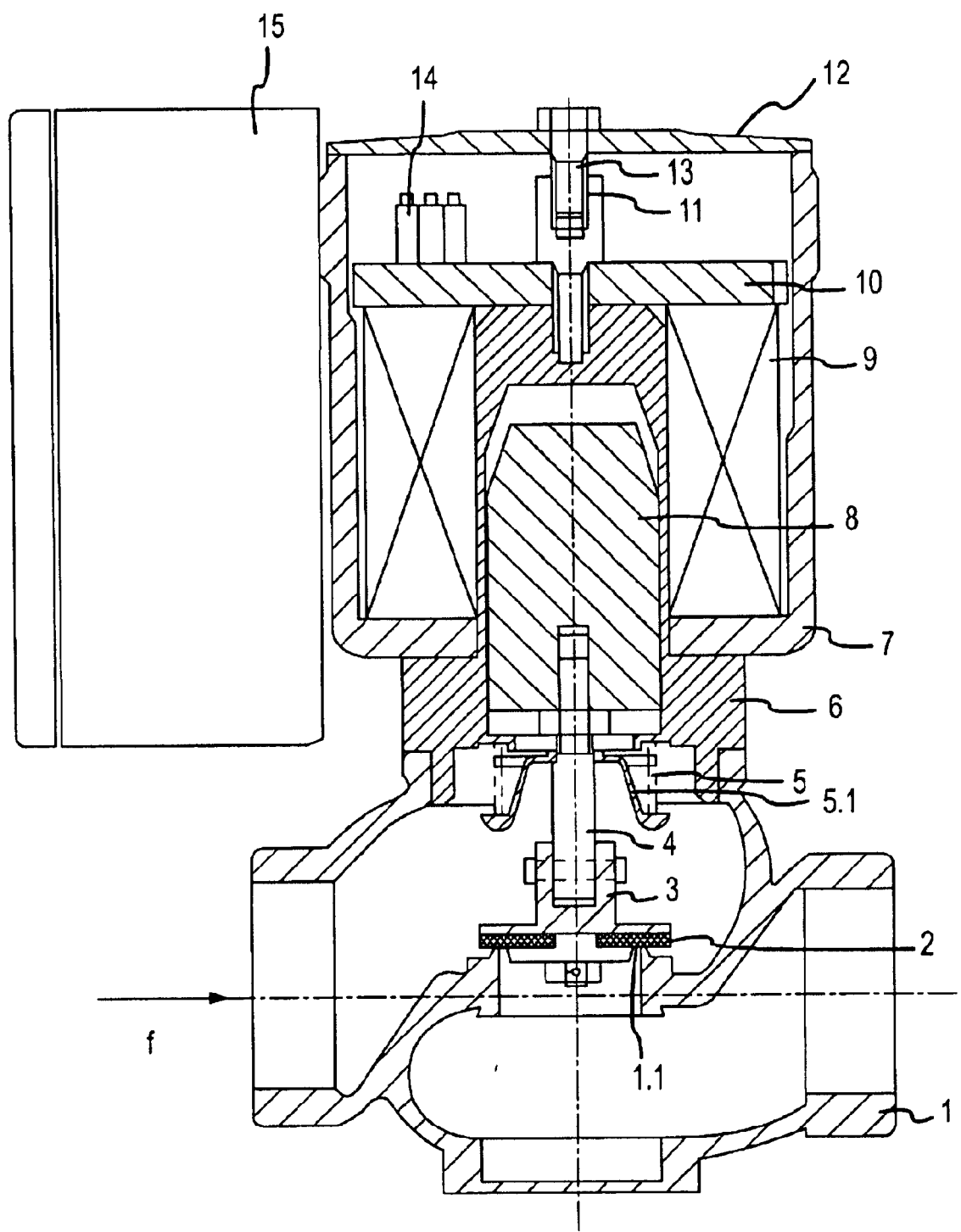
FIG. 1 is a sectional view of a first embodiment of a solenoid valve.

In terms of mechanics, the solenoid valve illustrated in FIG. 1 essentially includes the following conventional individual parts:

| | |
|---|---|
| Valve housing 1 | Magnet armature 8 affixed to valve disc shaft |
| Valve seat 1.1 | Magnet coil 9 |
| Valve disc seal 2 | Magnet yoke 10 |
| Valve disc 3 | Connecting bolts 11 |
| Valve disc shaft 4 | Magnet housing cover 12 |
| Valve disc restoring compression spring 5 | Cover screw 13 |
| Intermediate piece 5.1 | Magnet coil terminals 14 - schematically illustrated |
| Magnetic system base 6 | Electronic control unit 15 |
| Magnet housing 7 | |

The flow direction through the valve housing 1 is indicated by the arrow such that the valve in the currentless state is held in the closed position by the average flow pressure acting on the valve disc 3.

Figure 2:
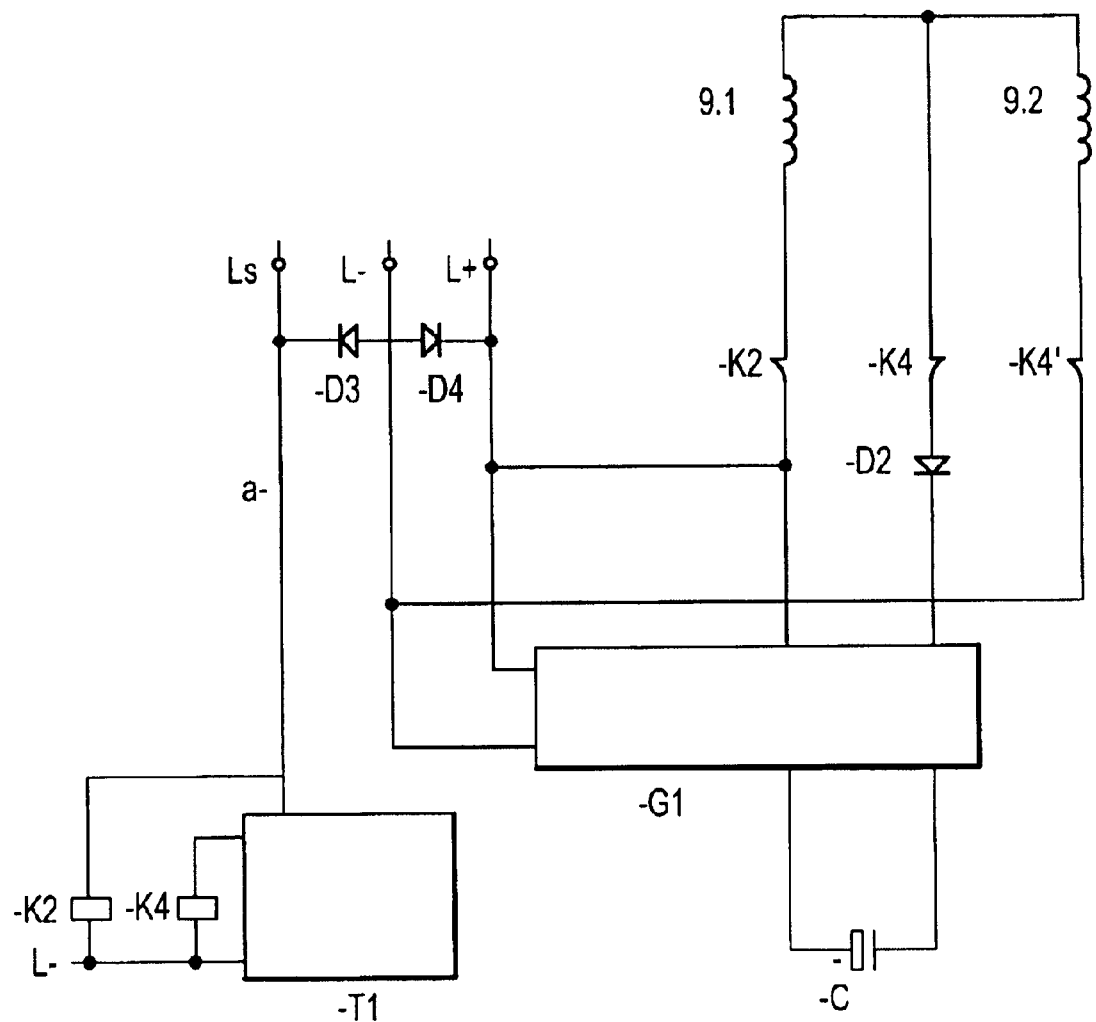
FIG. 2 is a block diagram of the control device for triggering the solenoid valve.

In accordance with FIG. 2, the magnet coil 9 includes a pickup winding 9.1 and a holding winding 9.2 with center tap. The pickup winding 9.1, which is designed for high electrical capacity, pulls the magnet armature 8 and thus the valve disc 3 upward for opening the valve. Then there is a switching over to the holding winding 9.2 that is designed with a lower electrical holding capacity that is sufficient for holding the valve disc 3 in the open position. For closing the valve, the holding winding 9.2 is brought into the currentless state so that the compression spring 5 moves the valve shaft 4 and thus the valve disc 3 downward via the intermediate piece 5.1 in order to push the valve disc 3 against the valve disc seat 1.1.

The terminals L+/L− connected/connectable to the power source (for instance, 24 V DC) are connected via appropriate line segments to the DC/DC converter G1 for charging a capacitor C (e.g., 15000 μF–50V). The terminal L+ is furthermore connected to a line branch leading to the pickup winding 9.1 in which there is a relay switch K2. The terminal L− is connected to the line branch leading to the holding winding 9.2 in which there is a relay switch K4'. The capacitor C is connectable for the purpose of charging via regulating and control members (not shown in detail) to the converter G1 and to the line branch containing the relay switch K2 and to the center tap branch that is located between the two windings 9.1 and 9.2 and that contains a relay switch K4 and a diode D2. Actuation of the solenoid valve is initiated via a terminal LS connected to the power source in order to actuate the relay switches K2 and K4/K4', whereby a timer T is allocated to the two relay switches K4, K4'.

The diodes D3 and D4 in the area of the terminals L+/L−/LS prevent an increase in induction voltage in the power supply, that is, they protect against an overload in the power supply.

When the solenoid valve is closed, the relay switches K2 and K4' are open, while the relay switch K4, which is located in the center tap line branch, is closed. The two relay switches K4 and K4' are coupled to one another such that the relay switch K4' is closed when relay switch K4 is opened and vice versa.

While the solenoid valve is in the closed position, a system voltage applied continuously to the terminals L+/L− via the DC/DC converter G1 interposed therebetween charges the capacitor C, and the converter G1 is deactivated once the capacitor has been charged completely. If the lower capacitor voltage limit is not achieved, for instance due to spontaneous discharge, the converter G1 is automatically activated so that the capacitor is recharged to its prespecified voltage, as is described in DE 43 25 578 A1, for instance.

For opening the solenoid valve, the relay switch K2 is closed via the control line a attached to the terminal LS, whereby the correspondingly switched capacitor C is discharged via the pickup winding 9.1 so that the pickup winding 9.1, which is designed with high electrical capacity, pulls the magnet armature upward and thus opens the valve. Controlled by the timer T, after a delay time of approximately 0.5 to 1 second, the relay switches K4/K4' coupled to one another are switched such that the relay switch K4 opens and the relay switch K4' closes. Thus the two windings 9.1 and 9.2 are switched in series and are actuated via the terminals L+/L− with the holding current that has a lower capacity and that is sufficient to hold the valve disc over the magnet armature 8 in the open position. During this time the capacitor C is again separated from the center tap line branch and the line branch that leads to the pickup winding 9.1 and is recharged in the manner described in the foregoing in accordance with appropriate controls.

When the solenoid valve is open, the power taken from the DC system drops to the level of the holding winding, whereby an additional low charging current of approx. 0.1 to 0.4 A is required during the period in which the capacitor is recharged. The individual components are selected such that the capacitor charging time is approximately 30 seconds, for instance.

For closing the solenoid valve, there is a switching back to the original condition via the terminal LS and the control line a, that is, the switches K2 and K4' are opened and the switch K4 is closed so that the compression spring 5 can move the valve disc 3 into the closed position.

The advantage of the inventive solution is the very low total current consumption despite high pickup power during the pickup time. The electrical feed line can be dimensioned substantially smaller compared to conventional actuation via a relay switch or protective circuit. Likewise, due to the considerably lower current consumption, large numbers of solenoid drives with capacitor charging can be switched at the same time without overtaxing the consumer power supply. An additional advantage of the invention is that magnet coils that are substantially smaller but have improved electrical properties can be used.

The pickup winding also heats up less since a high pickup power is required for only a brief period; during continuous operation only a distinctly lower holding capacity is used, whereby power losses caused by the coil heating up are minimized. This results in distinctly lower deviations between the operating current of a cold coil and the operating current of a coil that has already heated up.

Figure 3:
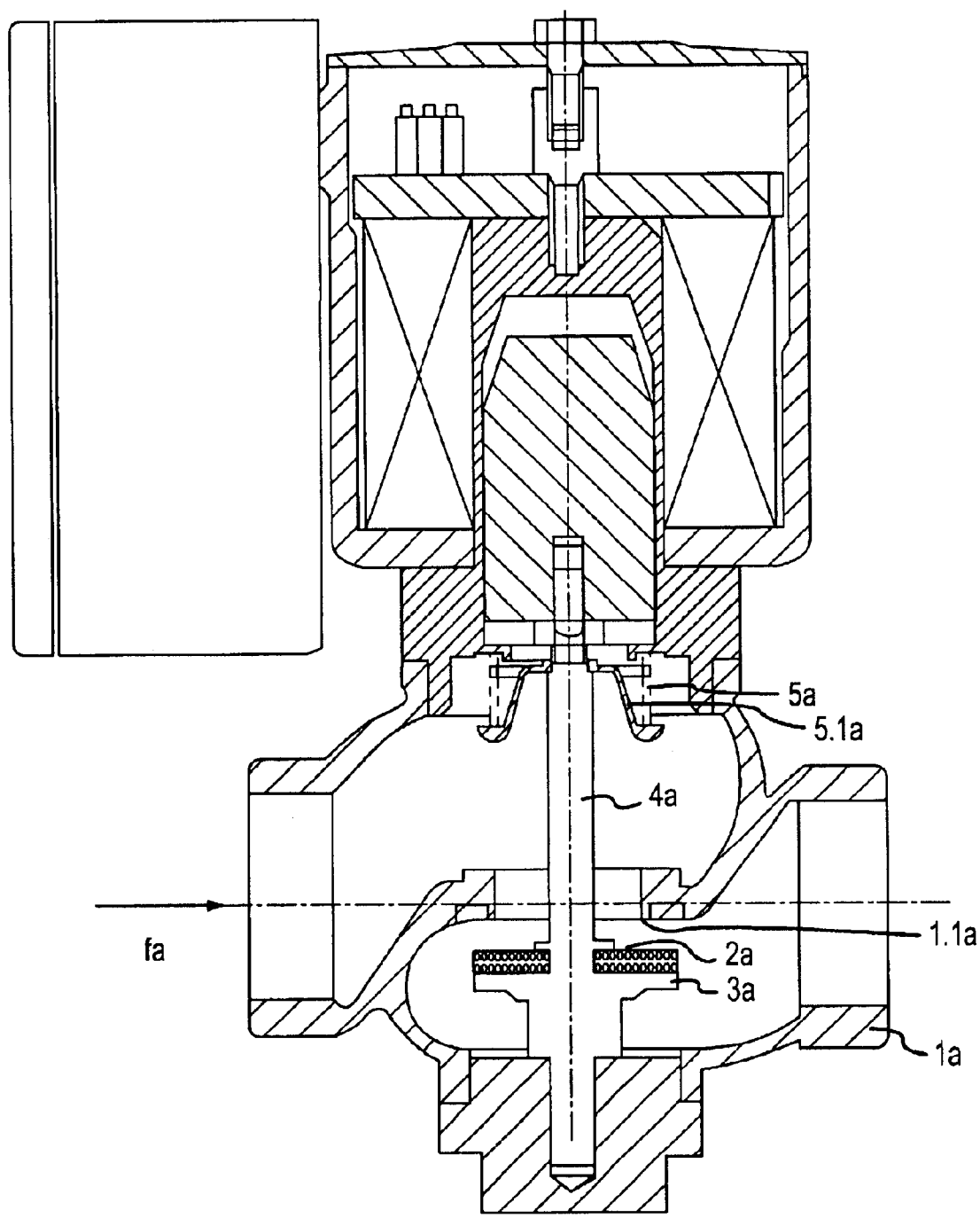
FIG. 3 is a sectional view of a second embodiment of the solenoid valve.

FIG. 3 illustrates a solenoid valve having the following individual parts:

Valve housing 1a
Valve seat 1.1a
Valve disc seal 3a
Valve disc 3a
Valve disc shaft 4a
Compression spring 5a
Intermediate piece 5.1a and a magnet system and magnet control system in accordance with FIGS. 1 and 2.

In the solenoid valve illustrated in FIG. 3, the valve disc 3a is held in the open position as illustrated by the pressure of the medium flowing in the direction of the arrow fa and/or of the compression spring 5a. The valve is closed in a manner similar to that in which the valve illustrated in FIG. 1 is opened, and this closed condition is maintained by means of the holding winding 9.2 until either the average flow pressure together with the force of the compression spring 5a is greater than the solenoid holding force of the holding winding 9.2, or until appropriate changeover opens the switches K4' and K2 and closes the switch K4, whereby the valve and its magnet coil are without current so that the valve is opened by the compression spring acting via the valve shaft 4a on the valve disc 5a and/or by the average flow pressure acting on the valve disc 3a.

The specification incorporates by reference the disclosure of German priority document 199 47 958.5 filed Oct. 6, 1999 and International priority document PCT/DE00/03336 of Sep. 26, 2000.

The present invention is, of course, in no way restricted to the specific disclosure of the specification and drawings, but also encompasses any modifications within the scope of the appended claims.

What is claimed is:

1. A solenoid valve, comprising:

a movable armature on which is attached a valve disk that is acted upon by a restoring spring;

a magnet coil having a pickup winding with a high electrical capacity for opening or closing a valve, and a holding winding, the capacity of which is designed to a) hold said valve disk in a position where it is raised from a valve seat when the valve is open, and b) hold said valve disk in a position where it rests against said valve seat when the valve is closed, wherein said magnet coil further includes a center tap;

a capacitor that for opening and closing is respectively connectable to a line branch leading to said pickup winding and to a branch leading to said center tap;

and a DC/DC converter disposed upstream of said capacitor such that said capacitor is switchable between a state where it is connected to said converter, and a state where it is connected to said pickup winding.

2. A solenoid valve according to claim 1, wherein a timer is provided for switching from a pickup current operation to a holding current operation, and wherein said pickup winding and said holding winding are disposed in series and said center tap branch is interrupted.

* * * * *